(12) United States Patent
Lee et al.

(10) Patent No.: US 7,545,436 B2
(45) Date of Patent: Jun. 9, 2009

(54) CAMERA ROTATION SUPPORT APPARATUS FOR VIDEO PRESENTER AND VIDEO PRESENTER HAVING THE SAME

(75) Inventors: Seung-yeob Lee, Seongnam-si (KR); Hyun-woo Cho, Seongnam-si (KR)

(73) Assignee: Samsung Techwin Co., Ltd. (KR)

( * ) Notice: Subject to any disclaimer, the term of this patent is extended or adjusted under 35 U.S.C. 154(b) by 852 days.

(21) Appl. No.: 11/052,433

(22) Filed: Feb. 7, 2005

(65) Prior Publication Data
US 2005/0237425 A1    Oct. 27, 2005

(30) Foreign Application Priority Data
Apr. 26, 2004    (KR) .................... 10-2004-0028729

(51) Int. Cl.
*H04N 5/225* (2006.01)
(52) U.S. Cl. .................. 348/373; 348/207.99
(58) Field of Classification Search ............ 348/207.99, 348/207.1, 373, 375, 374; 249/187
See application file for complete search history.

(56) References Cited

U.S. PATENT DOCUMENTS 5,863,209 A * 1/1999 Kim ........................... 348/373
6,991,384 B1 * 1/2006 Davis ......................... 396/428
7,310,116 B2 * 12/2007 Lee et al. ..................... 348/373
2004/0228477 A1 * 11/2004 Lee ........................ 379/433.01

FOREIGN PATENT DOCUMENTS

KR    2003-88520    11/2003

* cited by examiner

*Primary Examiner*—Lin Ye
*Assistant Examiner*—Gevell Selby
(74) *Attorney, Agent, or Firm*—Park & Associates IP Law LLC (57) ABSTRACT

Provided is a camera support structure for a video presenter which allows rotation of a camera connected to a base of the video presenter and supports the camera in an accurate location. The camera support structure of a video presenter includes a support arm, one end of which is joined with the base, an rotation guide member that includes an annular member having a ring shape in which a plurality of ball receiving holes are formed on one end part of the support arm, biasing elements that includes a plurality of rotation-fixing balls which are inserted into the ball receiving holes from an inner side of the annular member and a portion of the balls are elastically protruded to an outer side of the annular member, a annular plate element, the rotation of which can be prevented by fixing by the rotation-fixing balls and disposed to be able to be rotated on an outer side of the annular member of the rotation guide member, and a camera head that rotates with the annular plate element by coupling with the annular plate element and fixes a camera head having a camera.

19 Claims, 12 Drawing Sheets

CAMERA ROTATION SUPPORT APPARATUS FOR VIDEO PRESENTER AND VIDEO PRESENTER HAVING THE SAME

BACKGROUND OF THE INVENTION

This application claims priority of Korean Patent Application No. 2004-28729, filed on Apr. 26, 2004, in the Korean Intellectual Property Office, the disclosure of which is incorporated herein in its entirety by reference.

1 Field of the Invention

The present invention relates to a video presenter for inputting a video image of an object, the presenter having a camera support structure allowing adjustment of camera orientation.

2 Description of the Related Art

A video presenter is a device that typically uses a charge-coupled device (CCD) camera and a magnifying lens to display images of an object on a display device.

The video presenter can be manufactured in a variety of configurations according to the supporting structure of the camera. The camera supporting structure has an adjustment function for allowing the CCD camera mounted on the support arm to access the object from various angles according to the desire and necessity of the users. For that, the supporting structure usually provides multiple degrees of freedom permitting movement of the supporting arm to a large degree. However, in a conventional video presenter, such a camera support structure has known limitations as described herein below.

In a conventional camera support structure, the camera head is fixed at an upper end of a support shaft which extends upwardly from a table for placing a photographing object thereon. This known structure provides the advantage of fixing the camera in a stable position, but causes restriction on viewing when in particular the object is quite large.

In another conventional camera support structure, the camera head is fixed on an upper end of a support shaft that is mounted in a sloped or diagonal direction from a corner of the presenter table. In this arrangement, the size of the table for placing an object can be reduced, but it is difficult to locate the camera accurately on the center of the table. Some additional components are typically required to eliminate this drawback.

Japanese Patent Laid-Open Publication No. 7-10377 discloses a video presenter having a two-part support arm (i.e., with upper and lower arm members) for supporting a camera head. In this presenter, the lower arm can be rotated with respect to a table. The upper arm is in turn rotatably connected to the lower arm via a joint. In addition, the camera head can also be rotated with respect to the upper arm. However, the upper and lower arm members are designed to rotate only in one direction. Moreover, the arm must be refrained from excessive rotation when it approaches the table due to the volume of the camera.

According to the above identified Japanese patent disclosure, the support arm may include a locking mechanism, and the arm can be rotated when an operator presses a lock button. Here, however, the operator should also hold the camera to prevent the camera from falling and damaging the equipment.

Korean Patent Laid-Open Publication No. 2003-0088520 to the present inventor discloses a camera support structure to solve this problem as discussed herein below.

Figure 1:
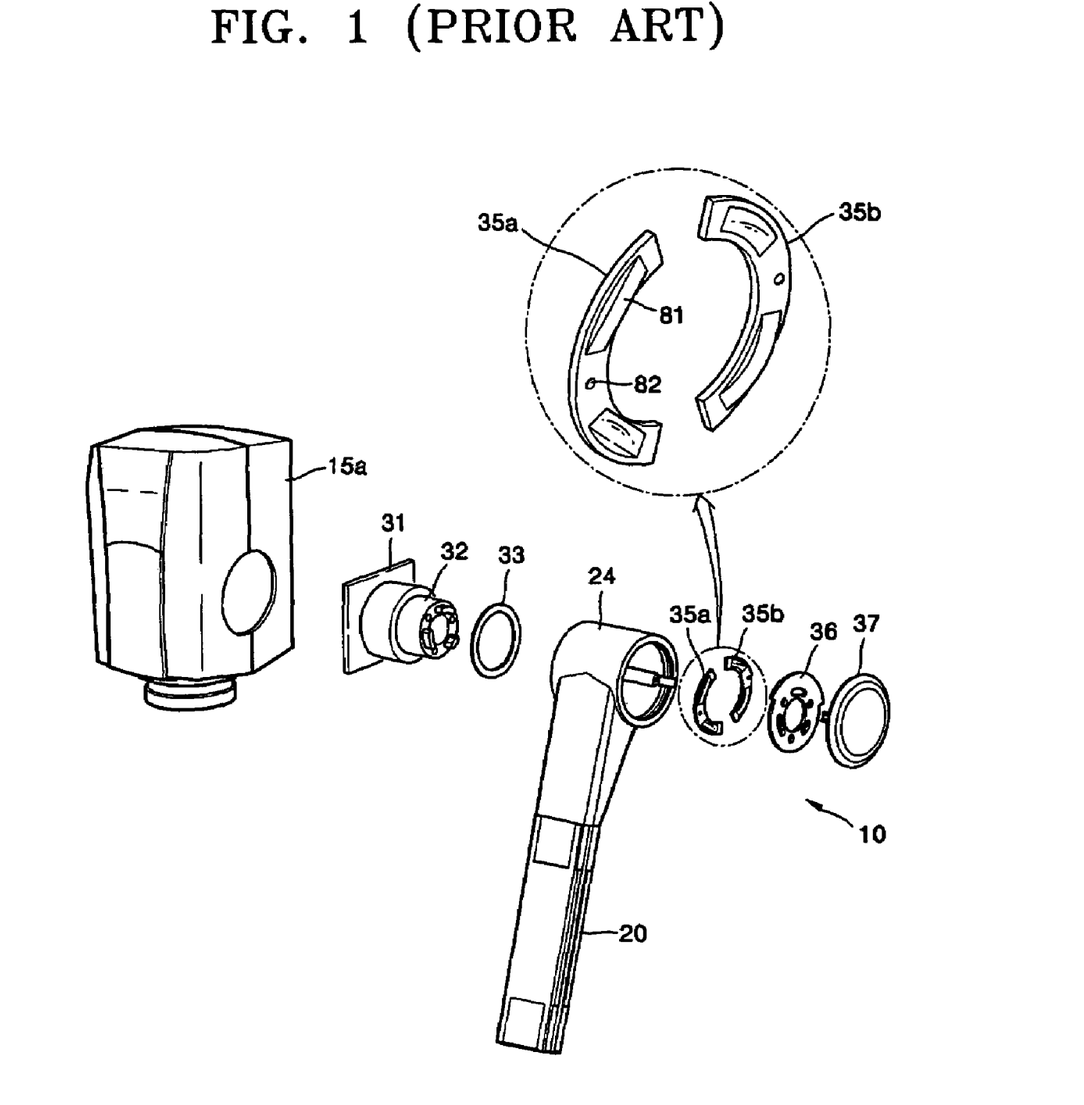
FIG. 1 is an exploded perspective view of a camera support apparatus for a video presenter, which is known in the art.

Referring to FIG. 1, a camera support device 10 of a video presenter includes a shaft unit 32 mounted to a bracket 31 which is fixed to a camera head 15a, and a shaft receiving unit 24 for receiving the shaft unit 32 therein, which is attached at an upper end of a support arm 20 extending upwardly from a table of the video presenter. The camera support device 10 further includes a fixing plate 36 fixed to the shaft unit 32 and contacting a proximal face of an annular portion (not shown) of the shaft receiving unit 24, springs 35a and 35b disposed between the fixing plate 36 and the annular portion of the shaft receiving unit 24, and a cover 37 covering the proximal end of the shaft receiving unit 24. A friction ring 33 is disposed between the distal portion of the cylindrical shaft unit 32 and the annular portion of the shaft receiving unit 24.

The springs 35a and 35b are formed respectively in a half ring shape, and each has two curved protrusion portions 81 and a protrusion groove 82 between the two curved protrusion portions 81. An elastic force is generated when the curved protrusion portions 81 are pressed. Accordingly, the springs 35a and 35b are seated on a spring seating groove (not shown) of the annular portion of the shaft receiving unit 34.

Free rotation of the camera is prevented by a force generated between the fixing plate 36 and a bottom surface of the shaft receiving unit 34 by the elastic force of the springs 35a and 35b. The camera head 15a can be rotated by providing an external force greater than the elastic force of the springs 35a and 35b.

Therefore, the camera head 15a can be maintained in a fixed position by the springs 35a and 35b as long as an external force is not applied to the camera.

Accordingly, an operator can use a video presenter having the camera support structure 10 with ease and without risking to damage the camera or the table or main body of the video presenter.

However, the elastic force of the springs 35a and 35b used for preventing the free rotation of the camera can be decreased from extended use if the camera is frequently moved, thereby incomplete fixing of the camera can occur. In particular, due to the weight of the camera, when the camera is fixed in a horizontal orientation, the springs 35a and 35 may not prevent free rotation of the camera after extended use of the presenter.

SUMMARY OF THE INVENTION

The present invention provides a camera support structure for a video presenter, by which the orientation of the camera can be conveniently adjusted and maintained, and a video presenter having such a camera support structure. The camera support structure of the present invention can also prevent free gravitational rotation of a camera mounted to the support arm, even when the orientation of the camera is fixed in a horizontal position for long time and after extended use.

According to one aspect of the present invention, the camera support structure includes a camera head with a bracket, a rotation guide member for providing and guiding rotation of the camera head, and rotation restricting means for allowing the camera to fix in selected orientations while restricting self-rotation of the camera head.

The rotation guide member is disposed on an upper end of the support arm, that is rotatably attached to a base of the video presenter, and preferably includes an annular member having radially disposed holes for receiving a plurality of balls therein.

The rotation restricting means includes biasing elements, preferably in form of at least one engaging ball disposed in the rotation guide member and elastically biased for restricting self-rotation of the camera head while allowing fixation of the camera head in certain selected orientations.

The bracket or an annular plate element attached to the bracket includes a plurality of ball engaging portions, preferably in form of grooves or holes, for the engagement with the engaging balls for allowing fixation of the camera head in certain selected orientations in cooperation with the rotation restricting means.

According to other aspects of the present invention, the video presenter includes: a base; a support arm including an upper end, and a lower end coupled to a base of the video presenter; a camera housing having a camera contained therein and including a bracket extending laterally from the camera housing, a proximal end face of the bracket including a plurality of ball engaging portions formed at selected locations; a rotation guide member disposed at the upper end of the support arm and configured to guide rotation the bracket of the camera housing for adjusting orientation of the camera in the camera housing; and, at least one ball disposed at the rotation guide member, the at least one ball elastically biasing toward the bracket such that the ball can engage with desired ones of the plurality of ball engaging portions of the bracket upon rotation of the bracket of the camera housing in order to stop the camera housing in a selected orientation.

The plurality of ball engaging portions can be formed at an annular plate element attached to a proximal end of the bracket for engaging with the ball. The rotation guide member preferably includes an annular member having at least one hole formed at a radial location, each hole containing an elastic element and corresponding one of the at least one ball therein for biasing the ball against the bracket by the elastic element. The annual member preferably includes a circular central opening, and the bracket includes a circular shaft rotatably received in the circular central opening of the annular member.

The video presenter preferably includes another annular plate element connected to a proximal end of the circular shaft of the bracket for securing the circular shaft. The video presenter preferably includes a rotation restriction element coupled with the proximal end face of circular shaft of the bracket or with the another annular plate element for restricting rotation of the bracket unless exerting a force beyond a certain level. The rotation restriction element preferably includes a plate-type elastic element with a stepped portion configured to restrict rotation of the bracket as the stopper of the rotation guide member contacts with the stepped portion.

BRIEF DESCRIPTION OF DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

Figure 2:
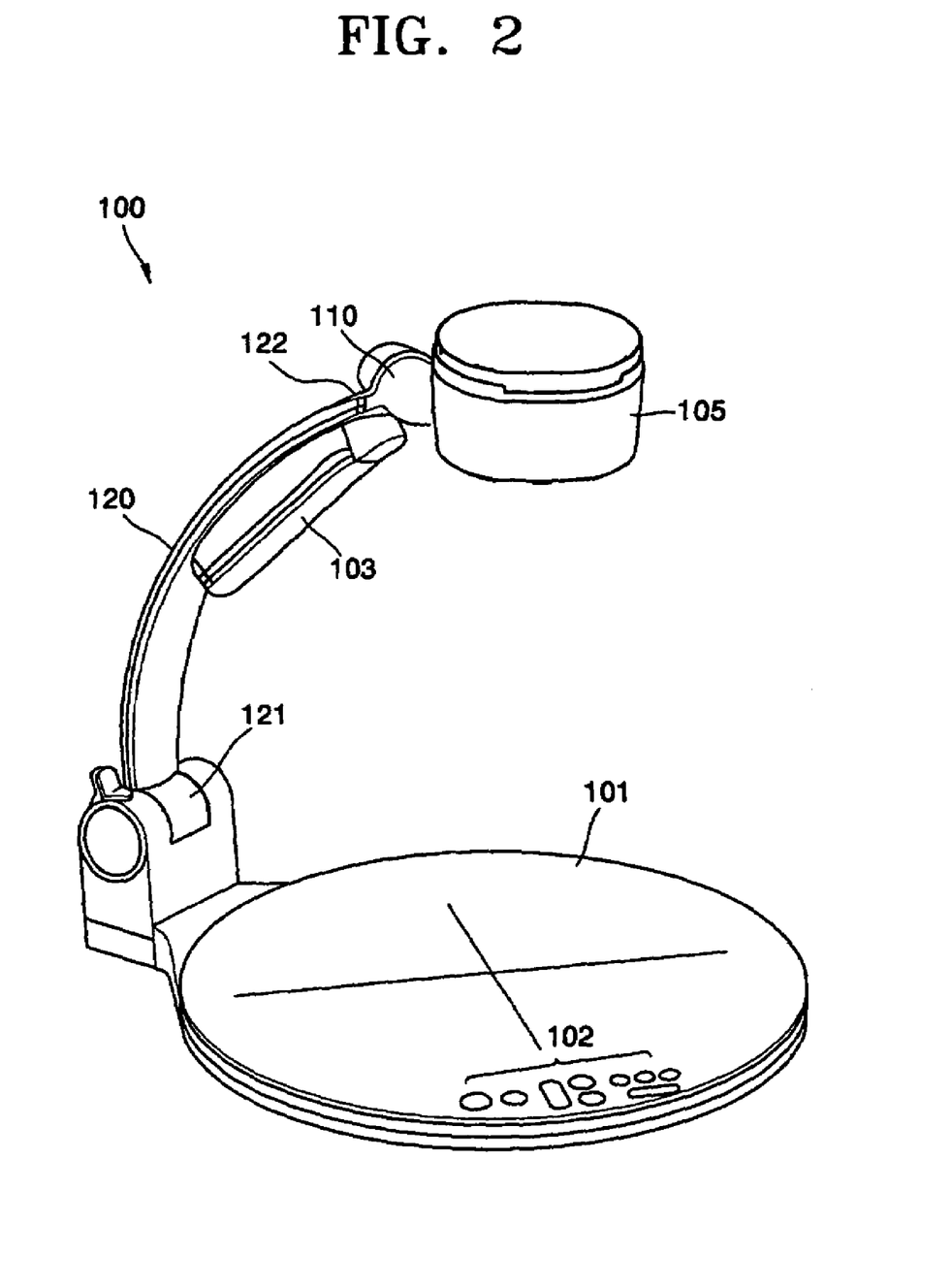
FIG. 2 is a perspective view of a video presenter constructed according to one embodiment of the present invention.

With reference to FIG. 2, an overall structure of video presenter 100 according to one embodiment of the present invention is illustrated and described herein. Video presenter 100 for inputting a video image of an object includes a table or base 101 for placing thereon an object to be photographed, a support arm 120 extending generally upwardly from the base 101, a camera housing 105 supported by the support arm 120, and a camera support assembly 110 that supports the camera head 105 in a manner rotatable with respect to the support arm 120.

An electric circuit that can control and process all operations of the video presenter 100 is placed in the base 101. Also, a control panel 102 is provided on an upper surface of the base 101. The operator can control the video presenter 100 by controlling switches in the control panel 102.

A lower end portion 121 of the support arm 120 is rotatably coupled with the base 101, and an upper end portion of the support arm 120 is connected with a camera head 150. As depicted in FIG. 2, the support arm 120 can be formed as one unit or can further include at least one joint unit at an intermediate portion of the support arm 120 so that the support arm 120 can be rotated or pivoted with articulation.

The camera support assembly 110 connects with the support arm 120 and the camera head 150. In addition, the camera support assembly 110 allows the camera head 150 to rotate relative to the support arm 120 for adjusting its position or orientation at a predetermined angle.

A lighting lamp 103 can be included in the video presenter 100. The lighting lamp 103 lights an object placed on the table 101. As depicted in FIG. 2, the lighting lamp 103 can be coupled with the support arm 120, or can be provided with a suitable structure at a different location, for example, placed at both sides of the base 101, and is preferably adjustable its lighting direction toward the table 101.

Figure 3:
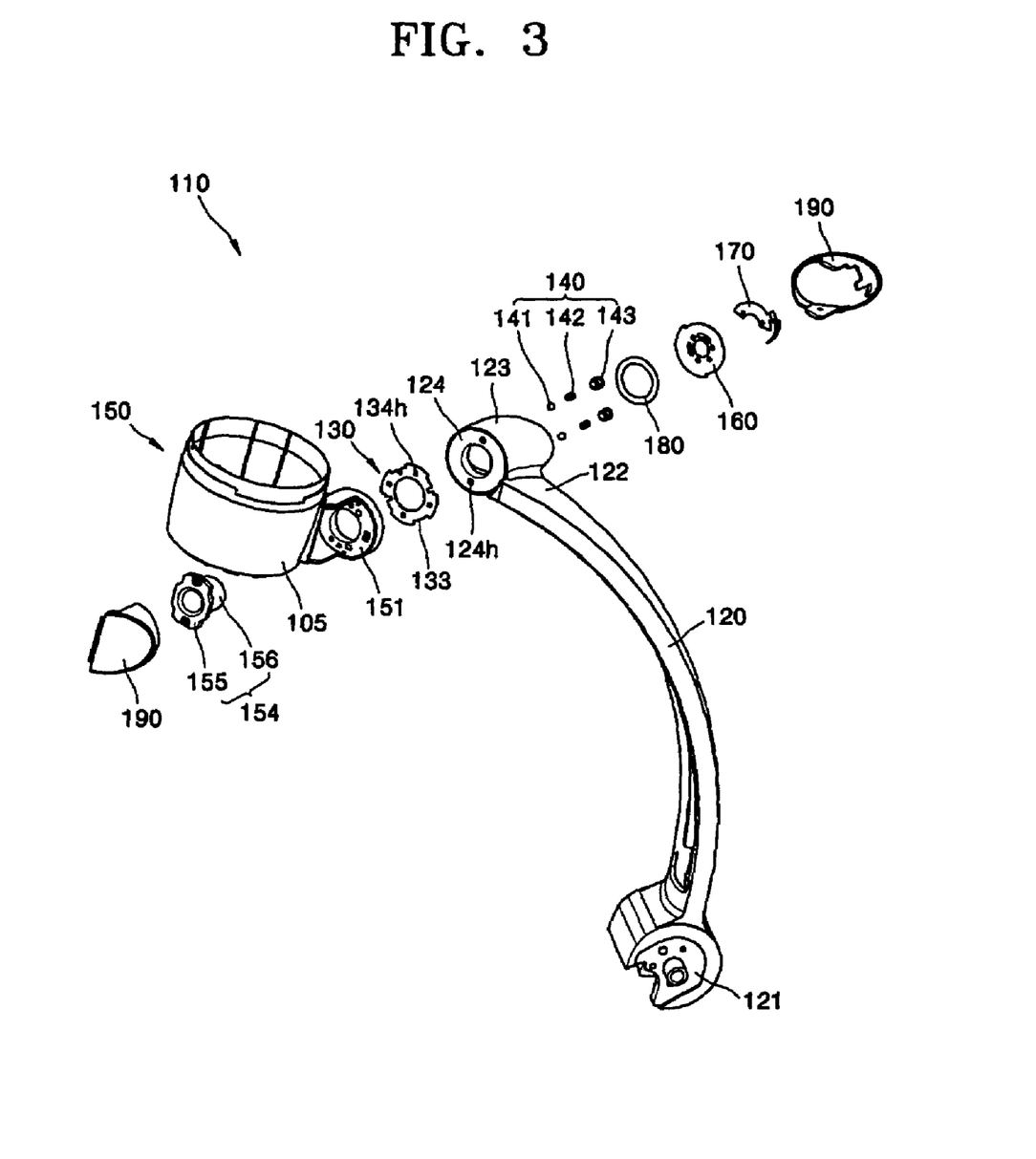
FIG. 3 is an exploded perspective view illustrating the camera support structure of the video presenter of FIG. 2.
Figure 4:
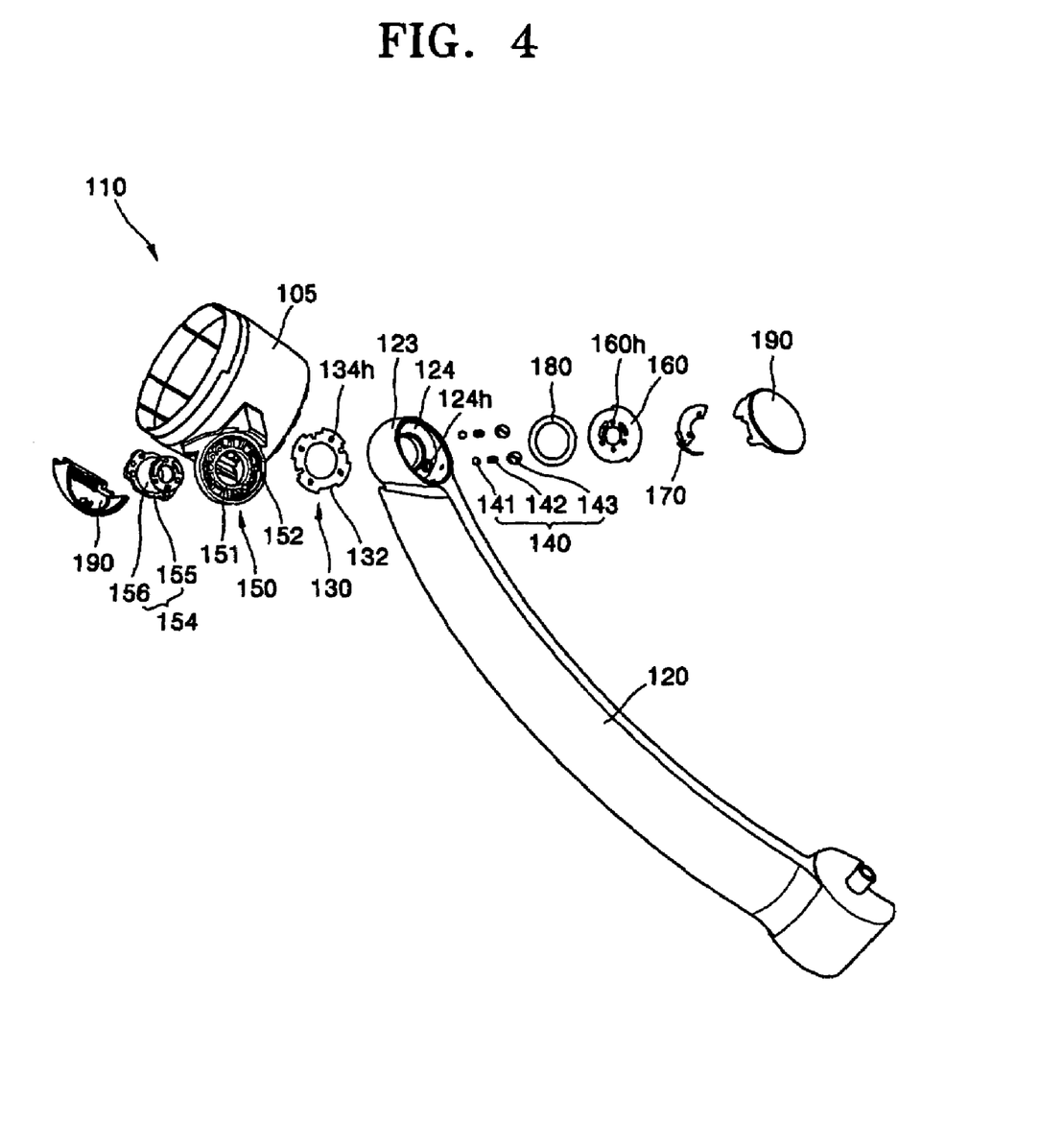
FIG. 4 is an exploded perspective view similar to FIG. 3 and illustrating the camera support structure of the video presenter of FIG. 2 which is viewed from a different direction.

FIGS. 3 and 4 illustrate one embodiment of the camera supporting structure of the invention in further details, which includes and the support arm 120 and the camera support assembly 110 attached to the support arm 120. The camera support assembly 110 includes the camera housing 105 with bracket 151 extending laterally from the camera housing, a rotation guide member 123, an annular plate element 130, biasing elements 140, a camera head 150, and other elements to be described herein below.

The rotation guide member 123 is formed on another end of the support arm 120 and includes an annular member 124 having a ring shape in which a plurality of ball receiving holes 124*h* are formed.

The annular plate element 130 is disposed next to the rotation guide member 123, and is rotatable relative to the rotation guide member 123. However, the rotation of the annular plate element 130 can stop at certain positions as the biasing elements 140 engage with corresponding engaging portions (to be described below) of the annular plate element 130. Biasing elements 140 include at least one ball 141 (preferably two or more balls) each received in respective ball receiving holes 124h, and elastic elements such as coil springs pressing the balls 141 toward the bracket 151. The annular plate element 130 includes a plurality of ball engaging portions for engaging with the balls 141, preferably in form of grooves or holes 134h disposed at the same radial location as that of the ball receiving holes 124h of the annular member 124.

The annular plate element 130 is connected to the bracket 151 of the camera housing 105, and thus can rotate along with the camera housing 105 relative to the support arm 120 and stationary elements of the rotation guide member 123.

The bracket 151 of the camera head 150 preferably includes a circular shaft 154. The circular shaft 154 can be an element separate with the bracket 151, as shown, or can be formed uniformly with the bracket. The circular shaft 154 includes a cylindrical portion 156 that passes through the central opening of the annular plate element 130 and received in the rotation guide member 123. In this case, the cylindrical portion 156 is coupled to another (i.e., a second) annular plate element 160 disposed on a proximal or inward side of the annular member 124 of the rotation guide member 123. The second annular plate element 160 is coupled to a rotation restriction member 170.

It is particularly noted that the term "proximal" as used in this invention disclosure refers to a direction or area which is near from the support arm 120, or a rightward direction when viewed in FIG. 3). Likewise, the term "distal" refers to a direction opposite from the "proximal" direction as defined above.

The ball receiving holes 124h are formed in the annular member 124. The biasing elements 140 are inserted into the ball receiving holes 124h from an inner side (proximal side) of the annular member 124. In this embodiment shown, the biasing elements 140 include the engaging balls 141, springs 142, and screws 143.

Also, the camera support assembly 110 can include a cover 190. The cover 190 protects the annular member 124, the rotation guide member 123, the second annular plate element 160, and the rotation restriction member 170 by covering an open external surface of the rotation restriction member 170.

Figure 5:
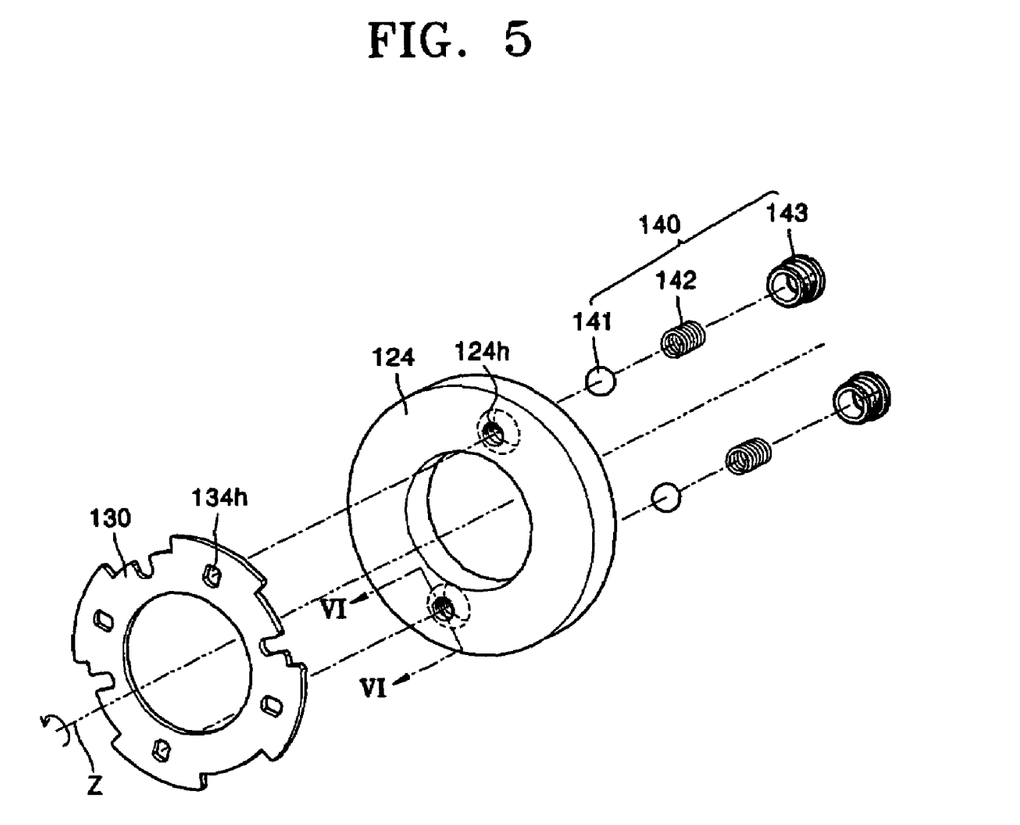
FIG. 5 is an exploded perspective view illustrating details of biasing elements, an annular members, and an annular plate element as depicted in FIGS. 3 and 4.

The receiving structure of the biasing elements 140 will now be described with reference to FIG. 5. The balls 141 are inserted in the ball receiving holes 124h formed on the annular member 124. The spring 142 that contacts the ball 141 is provided to apply an elastic force at the ball 141. The spring 142 is a compressed coil spring, and an end of it preferably contacts the ball 141 and other end contacts the screw.

The ball 141 and the spring 142 are inserted in the screw 143 which is then placed in the ball receiving holes 124h formed on the annular member 124.

The ball engaging holes 134h formed on the annular plate element 130 are configured to contact and receive at least a portion of the ball 141 therein. Accordingly, the ball 141 is inserted into the ball engaging holes 134h formed on the annular plate element 130 when the annular plate element 130 is rotated by a predetermined angle. Then, the ball is stopped by a stopper of the ball engaging holes 134h if the ball 141 is inserted into the ball engaging holes 134h. In this state, the free rotation of the camera can be prevented, and an external force greater than the force of the spring must be applied to rotate the annular plate element 130.

In the illustrated embodiment, preferably, two ball receiving holes 124h are formed on the annular member 124 at location symmetrical with respect to a rotation axis Z of the annular plate element 130 since the balls 141 can fix the camera on both sides of the annular plate element 130.

Also, there can be at least four ball engaging holes 134h. In this embodiment, the camera can be fixed in front, rear, downward, and keeping directions.

Figure 6:
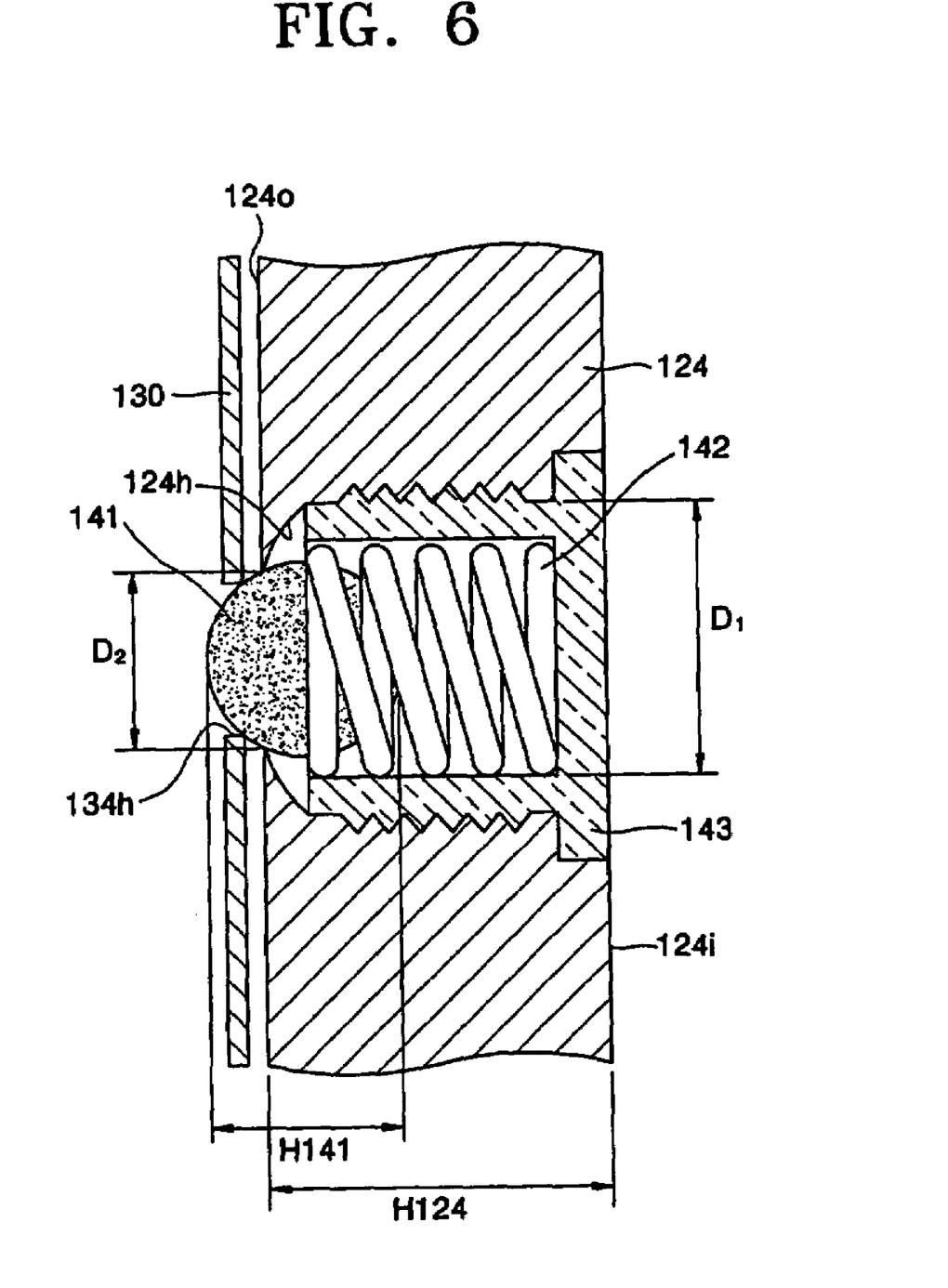
FIG. 6 is a cross-sectional view taken along line VI-VI of FIG. 5 illustrating a state where a ball is engaged with a ball engaging portion of the annular plate element of FIG. 5.

As depicted in FIG. 6, the ball receiving hole 124h has a greater diameter D1, than a diameter of the ball 141. Also, the diameter D1 of the ball receiving hole 124h at an inner surface of the annular member 124 is greater than the diameter D2 of the ball 141 and the diameter of the ball receiving hole 124h at an outer surface 124o of the annular member 124 is less than the diameter D2 of the ball 141. Accordingly, a portion of the ball 141 received in the ball receiving holes 124h is protruded outward of the ball receiving holes 124h.

Therefore, a portion of the ball 141 inserted into the ball receiving hole 124h contacts the annular plate element 130 disposed outside of the annular member 124 through the ball receiving holes 124h.

The ball 141 gets elastic force from the spring 142. Therefore, the relative rotation of the camera head 150 coupled with the annular plate element 130 is limited with respect to the support arm 120 since the rotation of the annular plate element 130 is limited by spring 142 when a sufficient external force is not applied. Therefore, to rotate the camera head 150 with respect to the support arm 120, an external force greater than the elastic force of the spring 142 must be applied to the ball 141.

Figure 7:
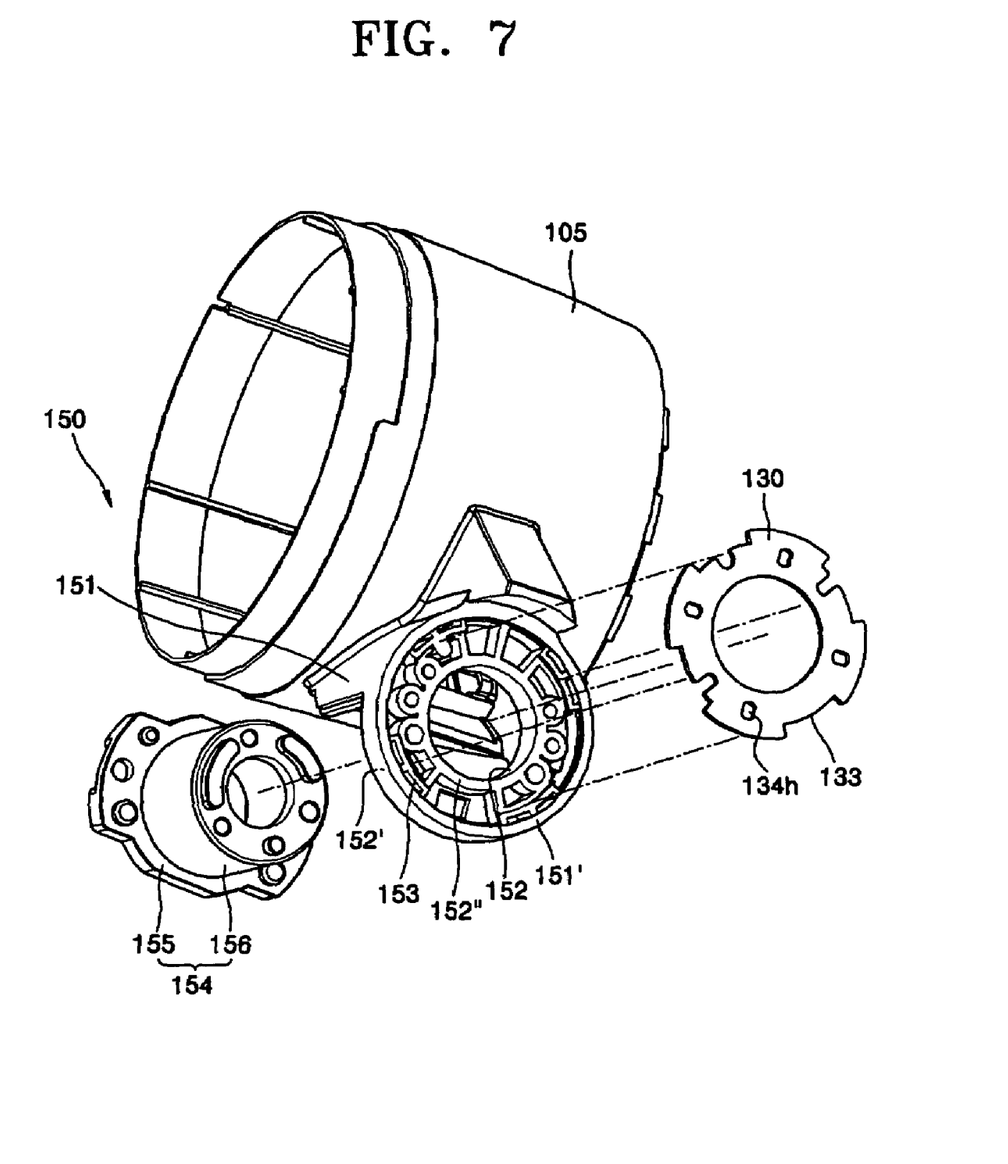
FIG. 7 is an exploded perspective view illustrating a coupling structure of the camera bracket with the circular shaft and the annular plate element of FIGS. 3 and 4.

Referring to FIG. 7, the camera head 150 includes the bracket 151 and the circular shaft 154. The bracket 151 has a cylinder shape coupled to a portion of an outer surface of the camera head 105 and includes a ring bottom plate (i.e., annular plate) 152 formed in a ring shape by inserting a portion from one side end 151' of the annular plate element 130.

The ring bottom plate 152 is preferably formed by inserting a portion from a side end 151' of the annular plate element 130 of the bracket 151, and the inserting thickness is preferably the same as the thickness of the annular plate element 130.

The circular shaft 154 is preferably inserted in a direction to a side 152' of the ring bottom plate-152. The circular shaft 154 includes a base 155 and a cylindrical portion 156 inserted in a direction to the ring bottom plate 152.

The cylindrical portion 156 passes through the annular plate element 130 and the first annular member 124. In this case, the base 155 is coupled with one side 152' of the ring bottom plate 152.

Also, the annular plate element 130 is preferably coupled to another side 152" of the ring bottom plate 152 of the bracket 151 by forming at least a convex part 153 in an inserting direction of the bracket 151 on an inner surface between the ring bottom plate 152 and an end unit 151' of the bracket 151 on a side of the annular plate element 130 and a concave unit 133 corresponding to the convex part 153. Therefore, the annular plate element 130 can be easily fixed to the bracket 151 since the convex part 153 functions as a key.

In this case, the convex part 153 of the bracket 151 and the concave unit 133 of the annular plate element 130 corresponding to the convex part 153 are preferably formed on an outer side from the center of the bracket 151 relative to the ball engaging holes 134h. That is, a portion having the same rotation radius identical to the ball engaging holes 134h is coupled to the engaging balls 141, and the balls 141 must be contacted to the annular plate element 130. The concave unit 133 of the annular plate element 130 must not be formed on the same location of the balls 141 so that the annular plate element 130 can contact the 141.

Figure 8:
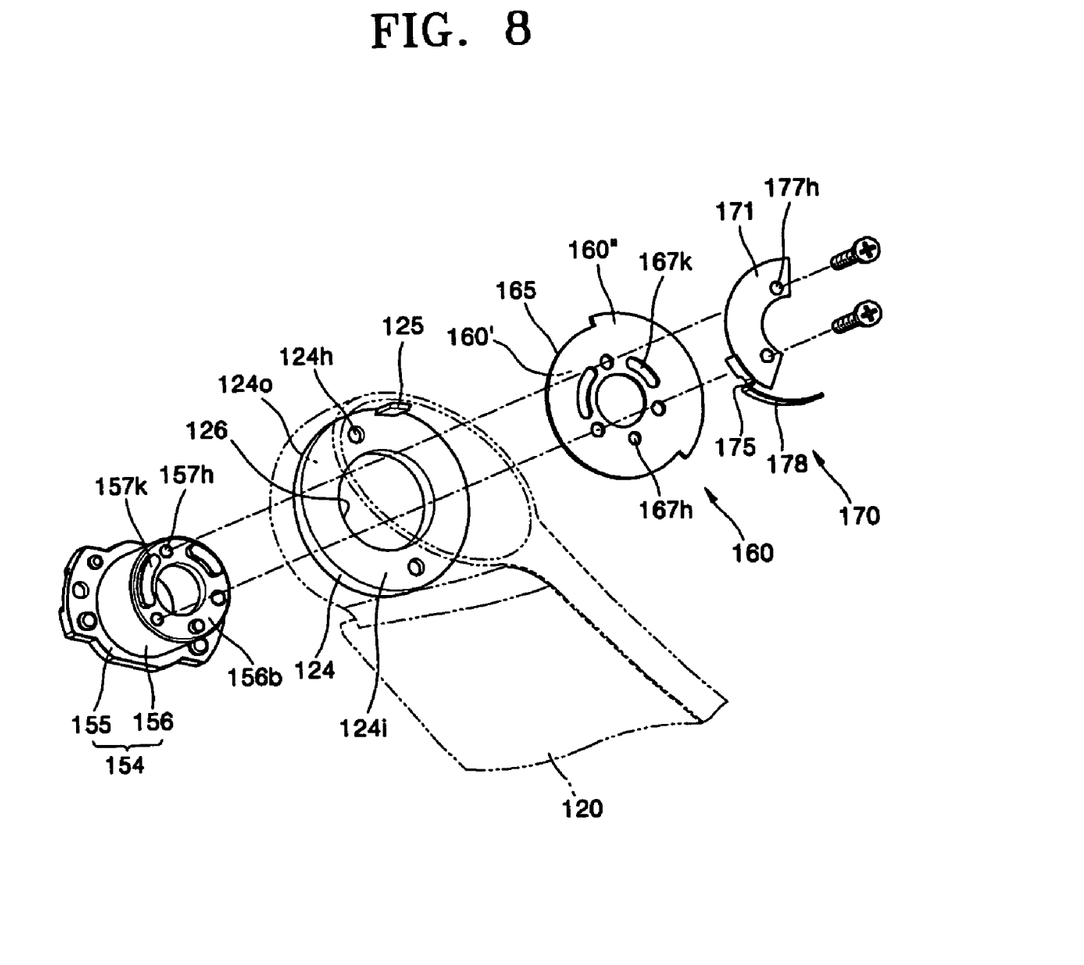
FIG. 8 is an exploded perspective view illustrating a coupling structure of the support arm of the video presenter with the circular shaft, a second annular plate element, and a rotation restriction member of FIGS. 3 and 4.

Referring to FIG. 8, the second annular plate element 160 is disposed in a direction to an inner (i.e., proximal) surface 124i of the first annular member 124 of the support arm 120, and the second annular plate element 160 preferably includes one side surface 160' which will be coupled to a bottom surface 156b of the cylindrical portion 156 of the circular shaft 154. Accordingly, the circular shaft 154 can rotate stably without leaving from the rotation guide member 123.

In this case, at least one screw hole 157h and a guiding protrusion part 157k having a circular arc shape can be formed on a bottom surface 156b of the cylindrical portion 156 of the circular shaft 154. In this case, the circular shaft 154 is preferably coupled to the second annular plate element 160 by forming a guiding groove 167k by which the guiding protrusion part 157k is inserted and supported in a second screw hole 167h corresponding to the first screw hole 157h.

That is, the first screw hole 157h of the cylindrical portion 156 and the second screw hole 167h of the second annular plate element 160 are coupled by a mechanical connecting means. In this case, the cylindrical portion 156 of the circular shaft 154 is inserted to a central opening 126 in a direction from an outer surface 124o of the annular member 124 of the rotation guide member 123. The second annular plate element 160 is inserted in a direction to an inner surface 124i of the annular member 124. Accordingly, an edge of the second annular plate element 160 is stopped by the first annular member 124 of the rotation guide member 123 when the second annular plate element 160 and the screw of the circular shaft 154 are coupled, and then, the circular shaft 154 can not leave from the support arm 120.

In this case, preferably, the rotation restriction member 170 that supports the camera head 105 while coupling with the second annular plate element 160 is further included on the other side 160" of the second annular plate element 160. The rotation restriction member 170 prevents an unnecessary rotation of the second annular plate element 160 when the camera is needed to be fixed on a certain position since the rotation restriction member 170 supports the second annular plate element 160, thereby preventing further rotation of the camera head 105 connected to the second annular plate element 160.

In this case, preferably, a protruded stopper 125 is formed in an inserting direction of the second annular plate element 160 on an inner surface of the rotation guide member 123 and, corresponding to this, the rotation restriction member 170 includes a fixing plate 171, a stumbling part or stepped portion 175, and a curved protrusion portion 178.

Figure 9A:
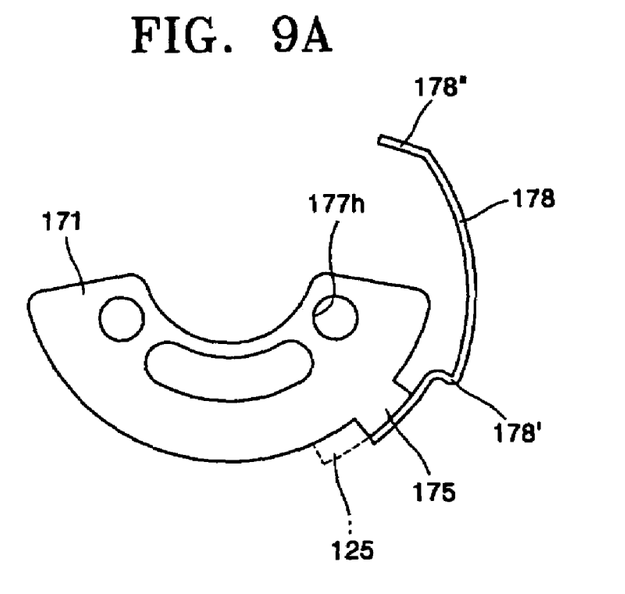
FIGS. 9A and 9B are respectively a plan view and a perspective view of a rotation restriction member of FIGS. 3 and 4.
Figure 9B:
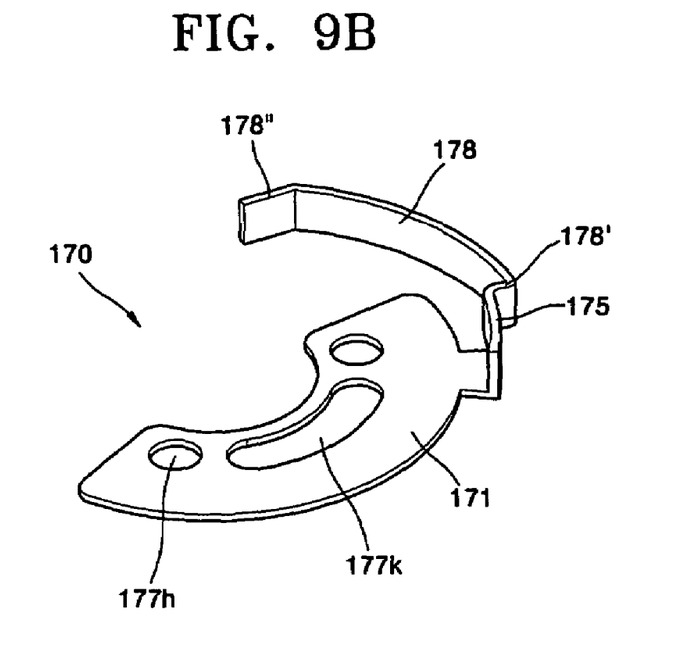

Referring to FIGS. 8, 9a, and 9b, the fixing plate 171 is formed in a half circle and to contact the second annular plate element 160. Here, the fixing plate 171 and the second annular plate element 160 are preferably formed to couple each other. As an example, a third screw hole 177h can be formed in the fixing plate 171 on portions corresponding to the first screw hole 157h of the bottom surface of the cylindrical portion 156 of the circular shaft 154 and to the second screw hole 167h of the second annular plate element 160. Accordingly, the circular shaft 154, the second annular plate element 160, and the rotation restriction member 170 can be screw coupled.

The stumbling part 175 is formed to protrude in a vertical direction of an outside of the fixing plate 171. That is, a protruded part of the stumbling part 175 is formed to stop by the protruded stopper 125 when the camera head 105 is rotated to a particular location.

One end 178' of the smooth protrusion portion 178 is formed to connect the stumbling part 175 and the smooth protrusion portion 178 is formed to bend inward of the fixing plate 171 from the one end 178' to another end 178".

Accordingly, the rotation restriction member 170 coupled with the second annular plate element 160 is rotated when the second annular plate element 160 is rotated. And the rotation restriction member 170 is stopped by blocking the stumbling part 175. At this time, the rotation restriction member 170 can continuously rotate by applying an external force greater than its elastic force.

Figure 10:
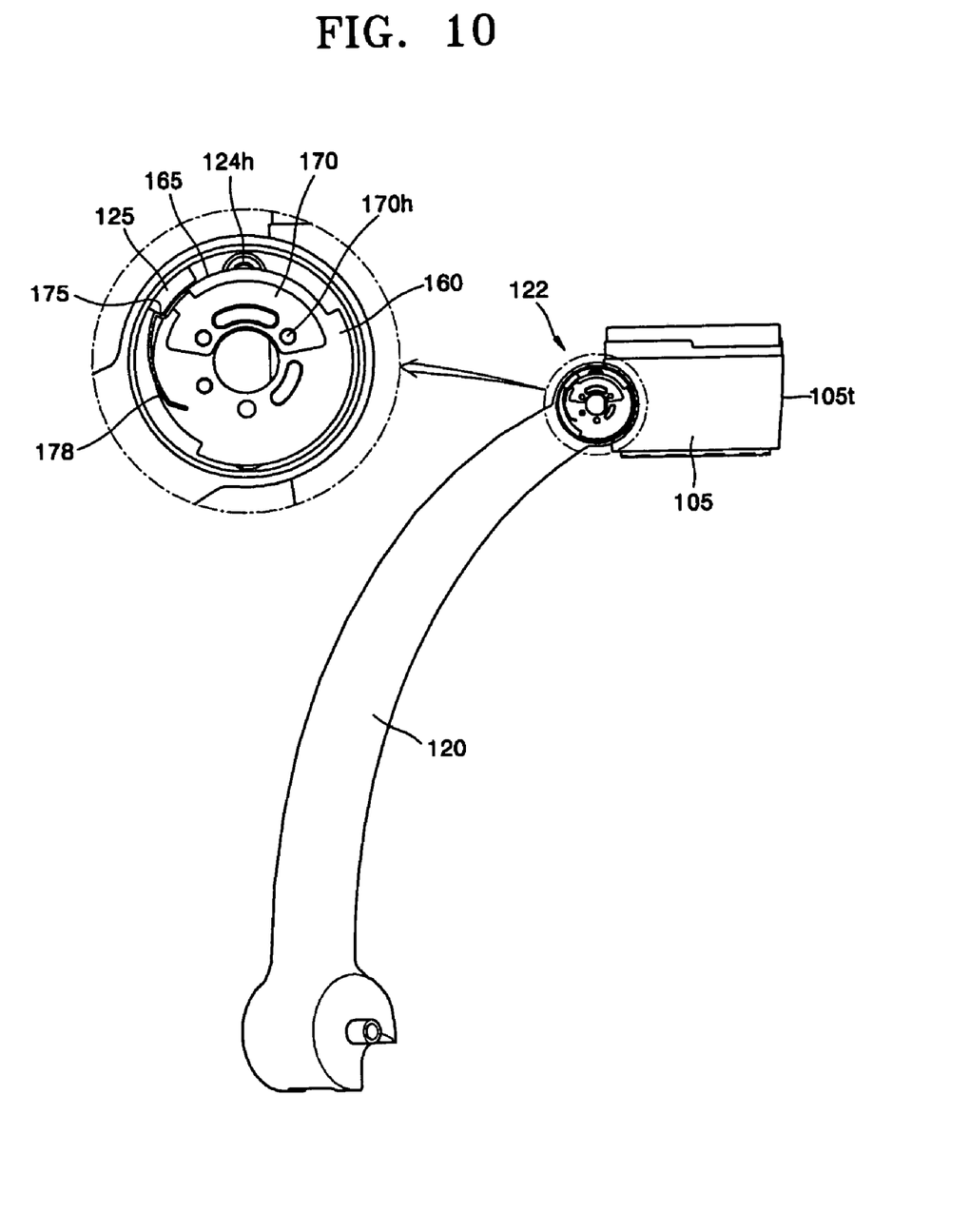
FIG. 10 is a partially cross-sectional view of the camera support structure when the camera of the video presenter of FIG. 2 is in normal use mode.

Particularly, as depicted in FIG. 10, the stumbling part 175 is preferably disposed to stop by the protruded stopper 125 when the camera head 105 is disposed horizontally. That is, the camera head 105 must be maintained horizontally when the camera takes pictures of an object placed on the base 101 of the video presenter 100. At this time, movement of the camera head 105 can be prevented by engagement of the balls 141 in the ball engaging holes 134h. However, here, the rotation of a top portion 150t of the camera head 105 that does not contact the camera support assembly 110 can occur in certain circumstances due to the weight of the camera head 105. Therefore, the top portion 150t of the camera head 105 can be fixed further not to rotate downward by disposing the stumbling part 175 of the rotation restriction member 170 to stop by the protruded stopper 125 of the rotation guide member 123 when the camera head 105 is maintained in horizontal orientation. A greater external force than the resistance force of the stumbling part 175 and the elastic force of the springs 142 to rotate the camera head 105 must be applied to move the camera head 105 from this state.

Figure 11:
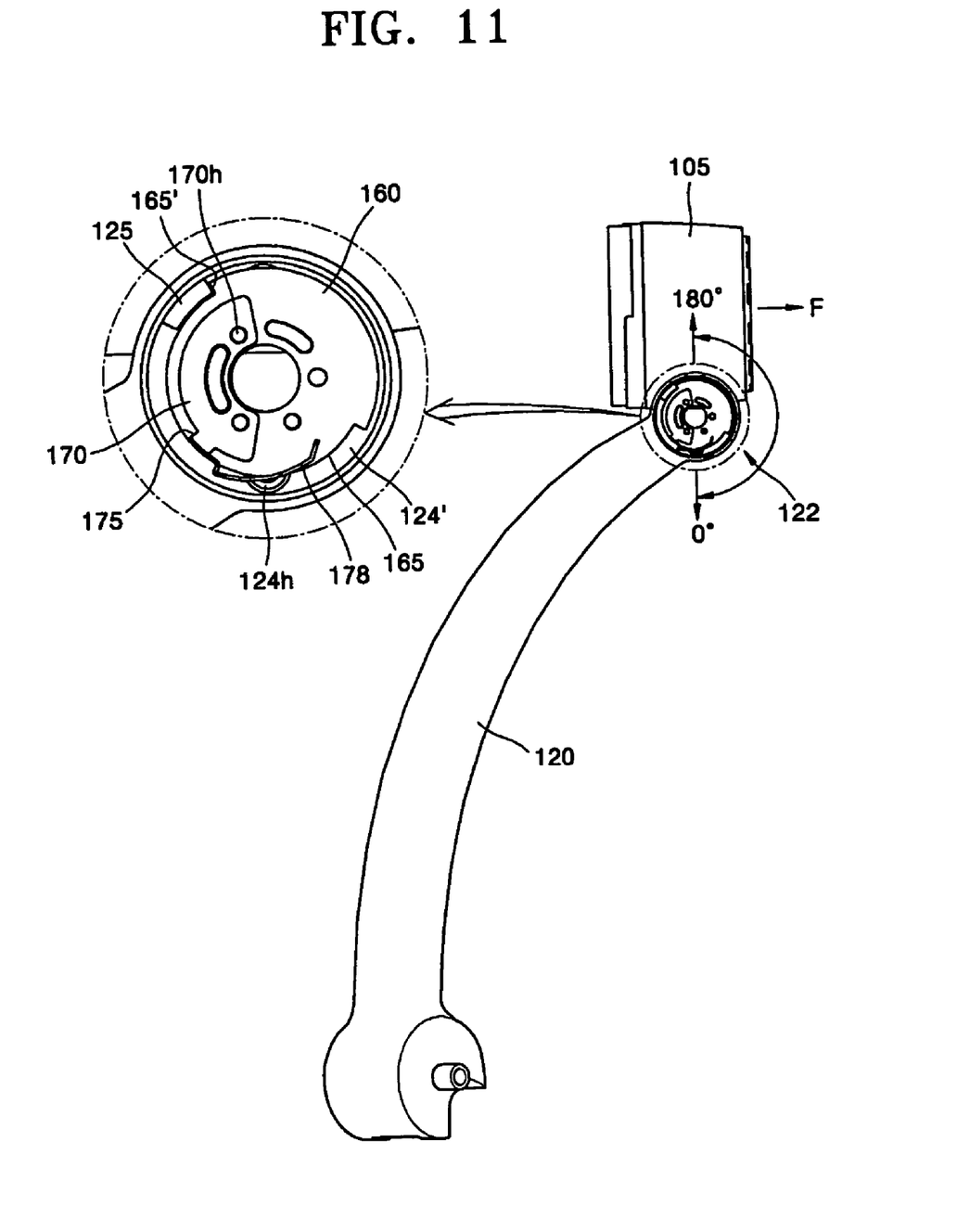
FIG. 11 is a partially cross-sectional view of the camera support structure of FIG. 2 when the camera takes a photograph of front.
Figure 12:
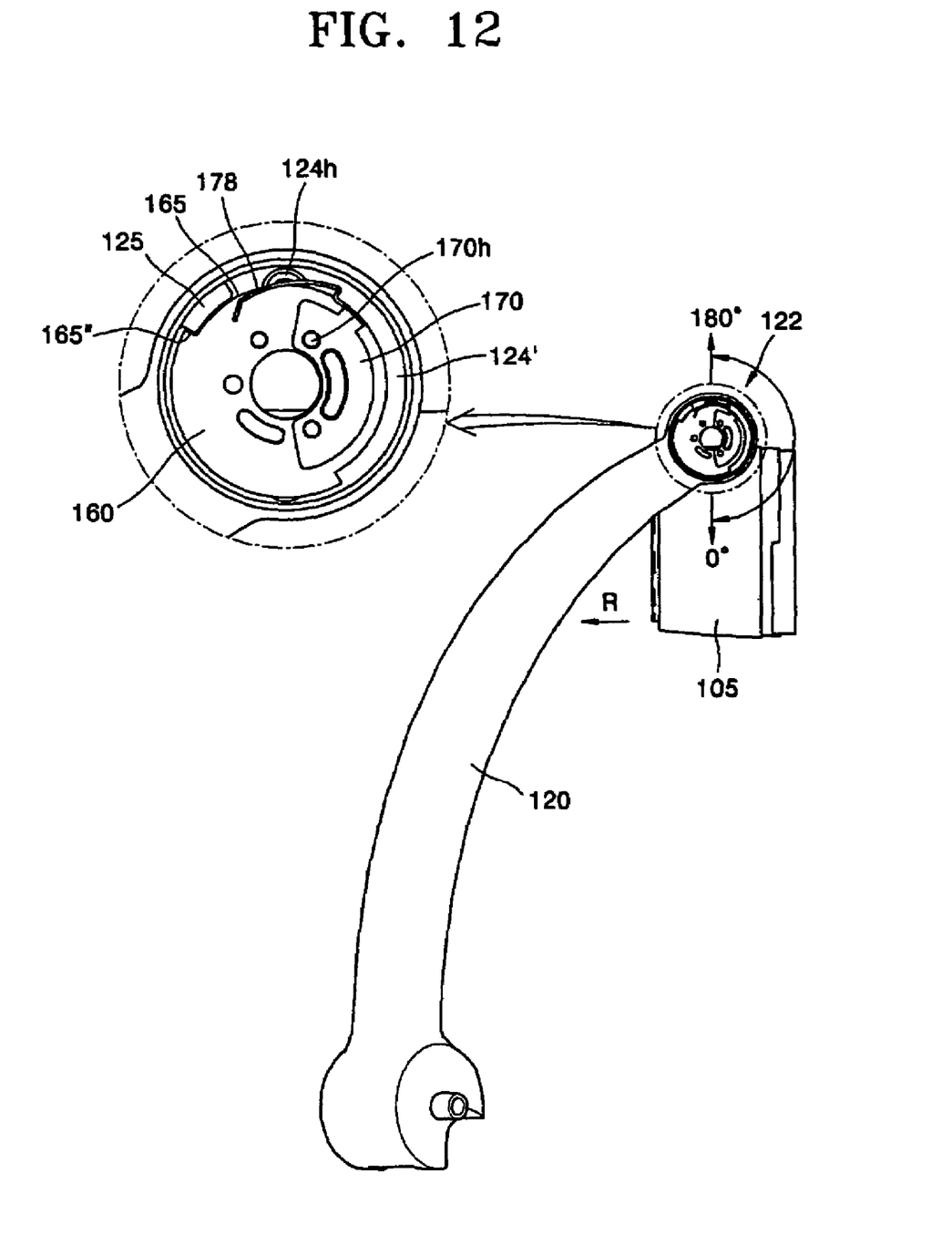
FIG. 12 is a partially cross-sectional view of the camera support structure of FIG. 2 when the camera takes a photograph of rear.

As depicted in FIGS. 10 through 12, a guiding part 165, which guides a portion of an external surface of the second annular plate element 160 to be disposed in an inner side of the protruded stopper 125, is formed and the protruded stopper 125 is preferably disposed in a portion of a region in which the guiding part 165 is formed. That is, the second annular plate element 160 can be rotated without being blocked by the protruded stopper 125 even though the guiding part 165 is rotated. Unlike this, the second annular plate element 160 can not further be rotated when one of the ends 165' and 165" is blocked by the protruded stopper 125. Therefore, the camera head 105 coupled to the second annular plate element 160 can be rotated only in a predetermined range.

For example, not to make the camera head 105 interfere with the support arm 120, the camera head 105 can be formed to rotate only in an opposite direction to the support arm 120 by modifying the dimensions of the guiding part 165.

That is, assuming that the downward direction is at 0° and, at this time, the camera is facing a rear side, then, the upward direction is at 180° and, at this time, the camera is facing front. In this case, the rotation of the camera head 105 in only an opposite direction to the support arm 120 from 0-180° will now be described with reference to FIGS. 10 through 12.

As depicted in FIG. 11, when the camera is facing front, the camera head 105 can not further be rotated to the left since one end part 165' of the guiding part 165 included in the second annular plate element 160 is blocked by the protruded stopper.

Also, as depicted in FIG. 12, when the camera is facing rear side by rotating in a right hand side direction, the camera head 105 can not further be rotated to the right since the other end unit 165" of the guiding part 165 included in the second annular plate element 160 is blocked by the protruded stopper.

In this case, as depicted in FIG. 10, the stumbling part 175 of the rotation restriction member 170 is preferably disposed on a central portion of the guiding part 165, and the second annular plate element 160 can move beyond the stumbling part 175 that acts as a spring by applying an external force greater than a predetermined force.

On the other hand, as depicted in FIGS. 3 and 4, a friction ring 180 is preferably further interposed between the inner side surface 124*i* of the first annular member 124 and the second annular plate element 160. The friction ring 180 is to minimize noise and wearing generated during the rotation of the second annular plate element 160.

According to the present invention, when the camera has to be fixed in a certain position, sliding or falling of the camera from a surface of a rotating plate can be prevented by the engaging balls with bias.

Also, the spring can be a coil spring, thereby reducing a manufacturing cost and a replacing cost.

The camera head can be securely fixed in a predetermined rotation position since the stumbling part is included in the rotation restriction member. Especially, the camera support assembly 110 can support the weight of the camera when the camera head is disposed horizontally for taking pictures of an object.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A camera support structure for a video presenter comprising:
   a camera housing having a camera contained therein and including a bracket extending laterally from the camera housing, a proximal end face of the bracket including a plurality of ball engaging portions formed at selected locations;
   a support arm including an upper end, and a lower end coupled to a base of the video presenter;
   a rotation guide member disposed at the upper end of the support arm and configured to guide rotation of the bracket of the camera housing in a rotational axis for adjusting orientation of the camera in the camera housing;
   at least one ball disposed at the rotation guide member, the at least one ball elastically biasing toward the bracket such that the ball can engage with desired ones of the plurality of ball engaging portions of the bracket upon rotation of the bracket of the camera housing in order to stop the camera housing in a selected orientation; and
   a rotation restriction element coupled with a proximal end face of the bracket or with an annular plate member attached to the proximal end face of the bracket for restricting rotation of the bracket unless exerting force beyond a certain level, the rotation restriction element including a stepped portion protruding from the rotation restriction element, the stepped portion configured to stop against a protruded stopper formed at the rotation guide member for restricting rotation of the bracket and the camera housing with the stepped portion.

2. The camera support structure for a video presenter of claim 1, wherein the rotation guide member includes an annular member having at least one hole formed at a radial location, each hole for receiving corresponding one of the at least one ball therein which biases toward the bracket by an elastic element.

3. The camera support structure for a video presenter of claim 1, wherein the plurality of ball engaging portions are formed at an annular plate element attached to a proximal end of the bracket for engaging with the ball.

4. The camera support structure for a video presenter of claim 3, wherein the plurality of ball engaging portions are holes or grooves formed at a regular interval and at a radius on the annular plate element.

5. The camera support structure for a video presenter of claim 2, wherein the annual member includes a circular central opening, and the bracket includes a circular shaft rotatably received in the circular central opening of the annular member.

6. The camera support structure for a video presenter of claim 5, wherein the circular shaft of the bracket is a separate member coupled with the bracket.

7. The camera support structure for a video presenter of claim 1, wherein the stepped portion of the rotation restriction element is configured to stop rotation of the bracket and the camera housing at a position where the camera housing is in horizontal orientation.

8. The camera support structure for a video presenter of claim 7, wherein the stepped portion is elastic, and the bracket and the camera housing can rotate over the restricted position when an external force greater than an elastic force of the elastic stepped portion is applied to assume a position other than the horizontal orientation of the camera housing.

9. The camera support structure for a video presenter of claim 8, wherein the rotation restriction element includes two rotation stopper portions disposed at locations displaced circumferentially from the stepped portion to limit the rotation of the bracket and the camera only in a predetermined range limited by the two rotation stopper portions.

10. The camera support structure for a video presenter of claim 6, further comprising a friction ring disposed between the proximal end face of the annular member and the another annular plate element.

11. A camera support structure for a video presenter comprising:
    a camera housing having a camera contained therein and including a bracket extending laterally from the camera housing, a proximal end face of the bracket including a plurality of ball engaging portions formed at selected locations;
    a support arm including an upper end, and a lower end coupled to a base of the video presenter;
    a rotation guide member disposed at the upper end of the support arm and configured to guide rotation of the bracket of the camera housing in a rotational axis for adjusting orientation of the camera in the camera housing; and
    a rotation restriction element coupled with a proximal end face of the bracket or with an annular plate member attached to the proximal end face of the bracket for restricting rotation of the bracket unless exerting force beyond a certain level, the rotation restriction element including a stepped portion protruding from the rotation restriction element, the stepped portion configured to stop against a protruded stopper formed at the rotation guide member for restricting rotation of the bracket and the camera housing with the stepped portion.

12. The camera support structure for a video presenter of claim 11, wherein the stepped portion is formed with an elastic plate element, and the bracket and the camera housing can rotate over the restricted position when an external force greater than an elastic force of the elastic stepped portion is applied.

13. A video presenter for inputting a video image of an object, comprising:

a base;

a support arm including an upper end, and a lower end coupled to a base of the video presenter;

a camera housing having a camera contained therein and including a bracket extending laterally from the camera housing, a proximal end face of the bracket including a plurality of ball engaging portions formed at selected locations;

a rotation guide member disposed at the upper end of the support arm and configured to guide rotation of the bracket of the camera housing for adjusting orientation of the camera in the camera housing;

at least one ball disposed at the rotation guide member, the at least one ball elastically biasing toward the bracket such that the ball can engage with desired ones of the plurality of ball engaging portions of the bracket upon rotation of the bracket of the camera housing in order to stop the camera housing in a selected orientation; and a rotation restriction element coupled with a proximal end face of the bracket or with an annular plate member attached to the proximal end face of the bracket for restricting rotation of the bracket unless exerting force beyond a certain level, the rotation restriction element including a stepped portion protruding from the rotation restriction element, the stepped portion configured to stop against a protruded stopper formed at the rotation guide member for restricting rotation of the bracket and the camera housing with the stepped portion.

14. The video presenter of claim 13, wherein the plurality of ball engaging portions are formed at an annular plate element attached to a proximal end of the bracket for engaging with the ball.

15. The video presenter of claim 13, wherein the rotation guide member includes an annular member having at least one hole formed at a radial location, each hole containing an elastic element and corresponding one of the at least one ball therein for biasing the ball against the bracket by the elastic element.

16. The video presenter of claim 15, wherein the annual member includes a circular central opening, and the bracket includes a circular shaft rotatably received in the circular central opening of the annular member.

17. The video presenter of claim 15, wherein the stepped portion of the rotation restriction element is configured to stop rotation of the bracket and the camera housing at a position where the camera housing is in horizontal orientation.

18. The video presenter of claim 17, wherein the stepped portion is elastic, and the bracket and the camera housing can rotate over the restricted position when an external force greater than an elastic force of the elastic stepped portion is applied to assume a position other than the horizontal orientation of the camera housing.

19. The video presenter of claim 18, wherein the rotation restriction element includes two rotation stopper portions disposed at locations displaced circumferentially from the stepped portion to limit the rotation of the bracket and the camera only in a predetermined range limited by the two rotation stopper portions.

* * * * *